(12) United States Patent
Lakshmanan et al.

(10) Patent No.: US 8,484,288 B2
(45) Date of Patent: Jul. 9, 2013

(54) LINKING VIRTUAL WORLDS AND COLLABORATION PLATFORMS BI-DIRECTIONALLY USING A CENTRAL IDENTITY MANAGEMENT SYSTEM

(75) Inventors: Geetika T. Lakshmanan, Cambridge, MA (US); Martin A. Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 12/576,633

(22) Filed: Oct. 9, 2009

(65) Prior Publication Data
US 2011/0087732 A1 Apr. 14, 2011

(51) Int. Cl.
*G06F 15/16* (2006.01)
(52) U.S. Cl.
USPC .......................................................... 709/204
(58) Field of Classification Search
USPC .................... 709/204; 705/1.1, 319; 715/700, 715/705, 706–713
See application file for complete search history.

(56) References Cited

U.S. PATENT DOCUMENTS

| | | | |
|---|---|---|---|
| 6,581,096 B1 | 6/2003 | Cottrille et al. | |
| 7,200,674 B2 | 4/2007 | Sapuram et al. | |
| 2008/0117861 A1 | 5/2008 | Balandina et al. | |
| 2008/0120558 A1 | 5/2008 | Nathan et al. | |
| 2008/0207329 A1* | 8/2008 | Wallace et al. | 463/42 |
| 2008/0302867 A1 | 12/2008 | Holberg | |
| 2008/0320131 A1 | 12/2008 | Chalmers et al. | |
| 2009/0138355 A1 | 5/2009 | Jung et al. | |
| 2009/0158151 A1* | 6/2009 | Cheng et al. | 715/706 |
| 2009/0158200 A1* | 6/2009 | Palahnuk et al. | 715/781 |

(Continued)

FOREIGN PATENT DOCUMENTS

JP 2005157586 6/2005

OTHER PUBLICATIONS

Goggins, et al., "Cooperation and Groupness: Community Formation in Small Onlline Collaborative Groups," ACM Digital Lib; pp. 207-215; 2007.

(Continued)

*Primary Examiner* — Scott Christensen
(74) *Attorney, Agent, or Firm* — Thomas Grzesik; Fleit Gibbons Gutman Bongini & Bianco PL

(57) ABSTRACT

A method, information processing system, and computer program storage product link information associated with a virtual world with information associated with a social collaboration platform. A virtual world user identifier and a social collaboration platform user identifier are stored. The virtual world identifier is associated with a set of virtual world contacts for the respective user. The social collaboration platform user identifier is associated with a set of social collaboration contacts for the user. The virtual world user identifier is linked to the social collaboration platform user identifier. An association is determined between at least one of the set of social collaboration contacts and the virtual world identifier set of virtual world contacts and the social collaboration platform user identifier, respectively, for the respective user. An information set associated with at least one of the virtual world user identifier and the social collaboration identifier is updated to include the association.

24 Claims, 11 Drawing Sheets

U.S. PATENT DOCUMENTS

| | | |
|---|---|---|
| 2009/0183071 A1* | 7/2009 | Smith et al. .................. 715/706 |
| 2009/0254358 A1* | 10/2009 | Li et al. ............................ 705/1 |
| 2009/0286598 A1 | 11/2009 | Do et al. |
| 2009/0327484 A1 | 12/2009 | Chen et al. |
| 2010/0146118 A1 | 6/2010 | Wie |
| 2010/0241698 A1 | 9/2010 | Hillerbrand |
| 2010/0325107 A1 | 12/2010 | Kenton et al. |
| 2011/0213974 A1 | 9/2011 | Ardon et al. |

OTHER PUBLICATIONS

Edwards, W.K., "Putting Computing in Context: An Infrastructure to Support Extensible Context-Enhanced Collaborative Applications," ACM; pp. 446-456; 2005.

Non-Final Rejection dated May 9, 2012 for U.S. Appl. No. 12/576,606.

Final Rejection dated Aug. 29, 2012 for U.S. Appl. No. 12/576,606.

* cited by examiner

LINKING VIRTUAL WORLDS AND COLLABORATION PLATFORMS BI-DIRECTIONALLY USING A CENTRAL IDENTITY MANAGEMENT SYSTEM

FIELD OF THE INVENTION

The present invention generally relates to virtual worlds and social collaboration platforms, and more particularly relates to bi-directionally linking virtual worlds and social collaboration platforms using a central identity management system.

BACKGROUND OF THE INVENTION

As of today, virtual worlds such as Second Life are generally not integrated with respect to identity management and notification/content exchange with social collaboration platforms such as Lotus Quickr, MySpace, developer forums, etc. As a result, while an individual is using an avatar in a virtual world, the person is not able to bi-directionally interact with a social collaboration platform outside the virtual world since trusted identities do not exist across these systems.

SUMMARY OF THE INVENTION

In one embodiment, an information processing system for linking information associated with a virtual world with information associated with a social collaboration platform is disclosed. The information processing system comprises a memory and a processor that is communicatively coupled to the memory. An identify management system is communicatively coupled to the memory and the processor. The identity management system comprises an identifier storing module adapted for storing a virtual world user identifier that identifies a respective user of a plurality of users in the virtual world. The virtual world identifier is associated with a set of virtual world contacts for the respective user. The identifier storing module also stores a social collaboration platform user identifier that identifies the respective user in a social collaboration platform. The social collaboration platform user identifier is associated with a set of social collaboration contacts for the respective user. A linking module is adapted for linking the virtual world user identifier to the social collaboration platform user identifier based on storing the virtual world and the social collaboration platform identifier. An association determining module is adapted for determining an association between at least one of the set of social collaboration contacts and the virtual world identifier set of virtual world contacts and the social collaboration platform user identifier, respectively, for the respective user based on the linking. An updating module is adapted for updating an information set associated with at least one of the virtual world user identifier and the social collaboration identifier to include the association that has been determined in response to the determining.

In another embodiment, a method for linking information associated with a virtual world with information associated with a social collaboration platform is disclosed. The method comprises executing by a processor residing on an information processing system the following. A virtual world user identifier that identifies a respective user of a plurality of users in the virtual world is stored. The virtual world identifier is associated with a set of virtual world contacts for the respective user. A social collaboration platform user identifier that identifies the respective user in a social collaboration platform is stored. The social collaboration platform user identifier is associated with a set of social collaboration contacts for the respective user. The virtual world user identifier is linked to the social collaboration platform user identifier based on storing the virtual world and the social collaboration platform identifier. An association is determined between at least one of the set of social collaboration contacts and the virtual world identifier set of virtual world contacts and the social collaboration platform user identifier, respectively, for the respective user based on the linking. An information set associated with at least one of the virtual world user identifier and the social collaboration identifier is updated to include the association that has been determined in response to the determining.

In yet another embodiment, a computer program product for linking a virtual world with a social collaboration platform. The computer program product comprises a computer readable storage medium having computer readable program code embodied therewith. The computer readable program code comprising computer readable program code configured to store a virtual world user identifier that identifies a respective user of a plurality of users in the virtual world. The virtual world identifier is associated with a set of virtual world contacts for the respective user. Computer readable program code stores social collaboration platform user identifier that identifies the respective user in a social collaboration platform. The social collaboration platform user identifier is associated with a set of social collaboration contacts for the respective user. Computer readable program code links the virtual world user identifier to the social collaboration platform user identifier based on storing the virtual world and the social collaboration platform identifier. Computer readable program code determines an association between at least one of the set of social collaboration contacts and the virtual world identifier set of virtual world contacts and the social collaboration platform user identifier, respectively, for the respective user based on the linking. Computer readable program code updates an information set associated with at least one of the virtual world user identifier and the social collaboration identifier to include the association that has been determined in response to the determining.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
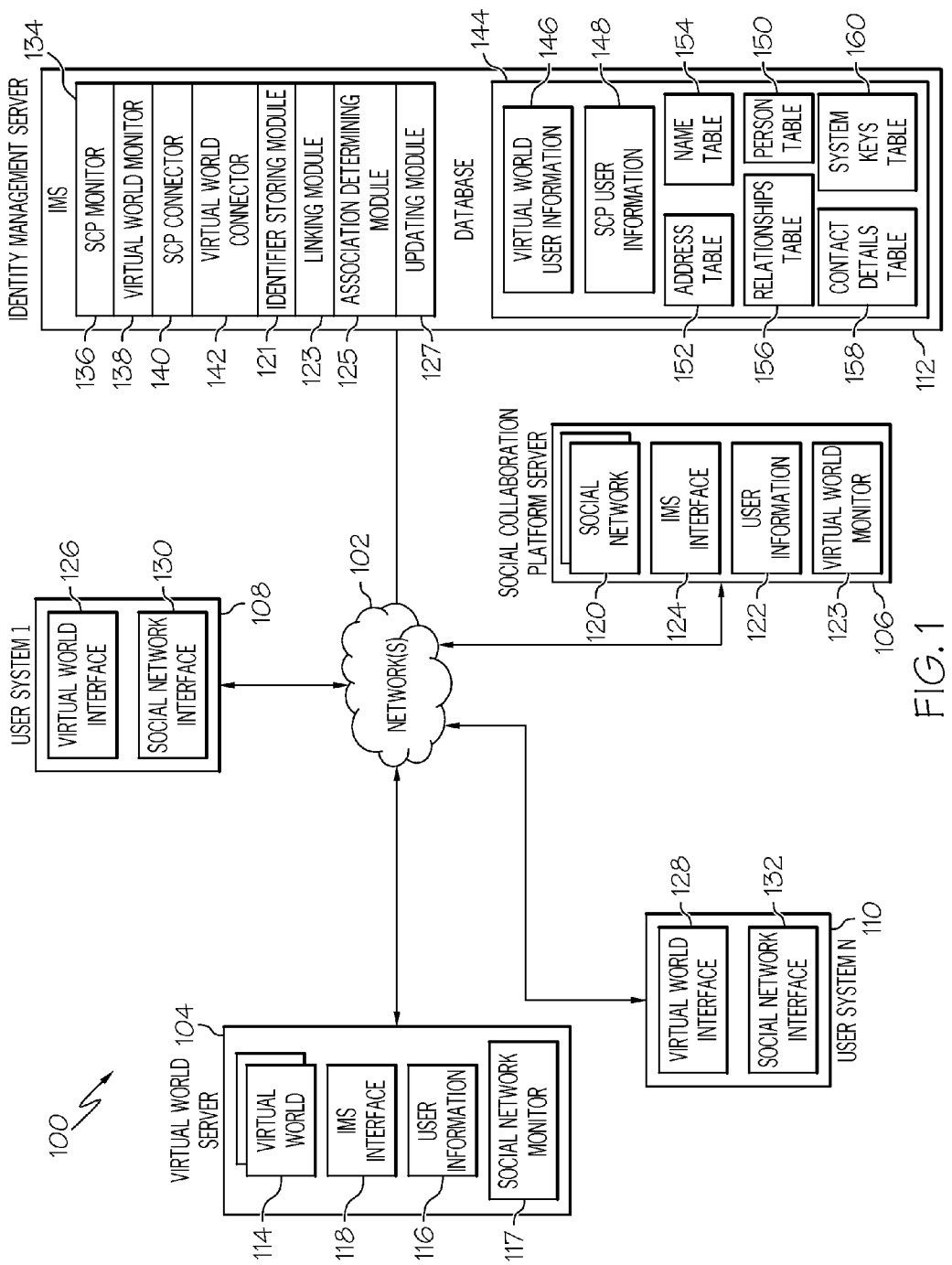
FIG. 1 is a block diagram illustrating one example of an operating environment according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

General Overview

As discussed above, virtual worlds are generally not integrated with respect to identity management and notification/content exchange with social collaboration platforms. Therefore, with respect to conventional communication (if any) from a social collaboration platform to a virtual word an individual generally does not know whether or not a contact in the social collaboration platform is online in the virtual world of the individual and vice versa. This is because the avatar id of the contact is not linked to identities used in the social collaboration platform and vice versa. One advantage of the various embodiments of the present invention is that one or more embodiments link virtual identities to identities of the same individual in social collaboration platforms in order to facilitate sharing information between members of the social collaboration platform. This allows, among other things, for sharing of information between the virtual world and social collaboration platform, for a user to be notified in a virtual world that contacts from his/her social network are online in the virtual world as well, and for a user to be notified in a social network that contacts from his/her virtual world are online in the social network.

Without this advantage of the various embodiments, a person is not aware of friends that are known from the social collaboration platform in the virtual worlds. The person is unable to "teleport to friend" once the other person becomes online in the virtual world. Also, embodiments of the present invention allows an automatic appearance of icons around another's avatar that indicate that the person associated with the other avatar shares the same/similar interests (information available in many social networks) in social collaboration platforms (e.g. both are vegetarians, like the same music, etc). Even further, a lack of trust exists; if a person is not sure that the identity of the other avatar is a person they know from the social collaboration platform, the person might not sit down in a private virtual room and share private information such as vacation photos.

Another problem with the current lack of communication from a social collaboration platform to a virtual word is that a person is unable receive notifications (e.g. RSS feeds) from the social collaboration platform while in the virtual world. One cause of this is that the avatar identity of the individual is not linked to the identity of that individual in the social collaboration platform. Furthermore, since the social collaboration platform cannot determine that a particular avatar is online, it does not make sense to blindly post notifications from a social collaboration platform to a virtual world avatar. The consequences of this are: (1) without a media switch, a user is "offline" from the social collaboration platform until the virtual world is left; and (2) a person might miss important notifications while active in a virtual world. For example, while a person is active in a virtual world, the person would not receive team meetings scheduled on a social collaboration platform such as Lotus Quickr and might miss the team meetings if staying in the virtual world for hours. Even worse, the person would not see an invite for a meeting in the virtual world.

With respect to the lack of conventional communication from a virtual world to a social collaboration platform, without trusted identities across these systems as provided by the various embodiments of the present invention, an individual is unable to establish a relationship for the social collaboration platform in a virtual world with a person associated with an avatar not yet registered on the social collaboration platform. This is because an indication of whether or not an avatar is a member of the social collaboration platform is not visible. If a person associated with an avatar A1 meets another avatar A2 in the virtual world and the communication indicates similar interests (same music, both are vegetarians, like the same movies, etc.), then it is not automatically possible for avatar A1 to invite the person associated with avatar A2 with an automatic option on a social collaboration platform used by avatar A1 to create a relationship between them in the social collaboration platform. Also, a person is unable to send notifications/content to a social collaboration platform, and therefore, cannot participate in the social collaboration platform while in a virtual world. One example of this is that a participant in a team meeting in a virtual world is unable to create meeting minutes for distribution in the social collaboration platform or an avatar in the virtual world is not able to post a message about an interesting event to a social collaboration platform.

The various embodiments of the present invention, on the other hand, include consistent Identity Management across social collaboration platforms and virtual worlds. This enables the use of trusted identities across social collaboration platforms and virtual worlds alike to enable "trusted communication". For example, users in a virtual world can confidently share private information in a private virtual room and a "teleport to friend" option based upon friendships in social collaboration platforms can be enabled. The various embodiments of the present invention also provide for the availability of information of a member of a social collaboration platform to others in a virtual world. This allows, for example, making a decision of whether or not to send notifications from the social collaboration platforms to either an avatar in the virtual world if the person is active there or to receiving systems in the real world (email, RSS, SMS, etc.). Also, a "teleport to social collaboration member in the virtual world" can be offered to meet a colleague/friend/etc. in the virtual world who is also a member in the same social collaboration platform. This is done efficiently in one embodiment for two reasons: (1) only active avatars are considered; and (2) for each avatar, only relationships from the social collaboration platform are considered (and not "blindly" checking for all avatars). Another advantage is that an ability to immediately participate in a social collaboration platform from a virtual world using the trusted identity to create content/post information to the social collaboration platform is provided.

Operating Environment

According to one embodiment, FIG. 1 illustrates one example of an operating environment/system 100 bi-directionally linking virtual worlds and social collaboration platforms. It should be noted that although that some embodiments discussed below are directed at linking a user's social network contacts to his/her virtual world identity to notify the user when a social network contact is online within the virtual world, the same embodiments also apply to linking a user's virtual network contacts to the user's social network identity to notify the user when a virtual world contact is online within the social network. It should be noted that one example of graphically managing links/associations between virtual world information and social network information is discussed in greater detail in the commonly owned and co-pending U.S. application entitled "Managing Connections Between Real World And Virtual World Communities" filed on even date with the present inventors and by the same inventors as the present application, said application is hereby incorporated by reference in its entirety.

In particular, FIG. 1 shows one or more networks 102 that, in one embodiment, are wide area networks, local area networks, wired networks, wireless networks, and/or the like. In one embodiment, the environment 100 includes a plurality of information processing systems 104, 106, 108, 110, 112 that are communicatively coupled to the network(s) 102. The information processing systems 104, 106, 108, 110, 112 include one or more virtual world servers 104, one or more social collaboration platform servers 106, one or more user systems 108, 110, and one or more identify management servers 112.

The virtual world server 104 comprises at least one virtual world 114, which creates a computer simulated world with real world aspects. The virtual world server 104 also includes user information 116 such as user contact information, user profile information, user identification information, avatar information, and the like. The user information 116 can include any and all information that is required for a user to use and interact with the virtual world 114. The virtual world server 104 also includes an identity management system ("IMS") 118 interface for interacting with the IMS 134 of the IMS server 112, discussed below. The virtual world server 104 also includes a social network monitor 117 for communicating with the social network(s) 120, also discussed below.

The social collaboration platform ("SCP") server 106 comprises at least one social network 120. The SCP server 106 also includes user information 122 such as user contact information, user profile information, user identification information, information, and the like. The user information 122 can include any and all information that is required for a user to use and interact with the social network 120. The SCP server 106 also includes an identity management system ("IMS") interface 124 for interacting with the IMS 134 of the IMS server 112. The SCP server 106 also includes a virtual world monitor 123 that allows the social network 120 to communicate with the virtual world 114.

The user systems 108, 110 each include one or more virtual world interfaces 126, 128 and/or social network interfaces 130, 132. The virtual world interfaces 126, 128 and social network interfaces 130, 132 allow the user systems 108, 110 to communicate with the respective virtual world(s) 114 and social network(s) 120. The virtual world interfaces 126, 128 and social network interfaces 130, 132 also allow a user associated with each user system 108, 110 to interact with the respective virtual world(s) 114 and social network(s) 120. The virtual world interfaces 126, 128 and social network interfaces 130, 132, in one embodiment, can be a tool such as an application(s), a website, a web application, a mashup, and the like.

The IMS server 112, in one embodiment, includes an IMS 134 that communicatively couples the virtual world 114 and the social network 120 together. The IMS 134, in one embodiment, includes an identifier storing module 121, a linking module 123, an association determining module 125, an updating module 127, an SCP monitor 136, a social network (SCP) connector 140, and a virtual world connector 142.

The identifier storing module 121 stores a virtual world user identifier that identifies a respective user in the virtual world 114. The identifier storing module 121 also stores a social collaboration platform user identifier that identifies the respective user in the social collaboration platform 120. The linking module 123 links the virtual world user identifier to the social collaboration platform user identifier. The association determining module 125 determines an association between a set of social collaboration contacts and a virtual world identifier, and/or a set of virtual world contacts and a social collaboration platform user identifier, respectively, for the respective user. The updating module 127 updates an information set such as the virtual world user information 146, SCP user information 148, relationships table 156, or the like that is associated with at least one of the virtual world user identifier and the social collaboration identifier to include the association determined by the association determining module 125.

The SCP monitor 136 monitors the social network 120 and the virtual world monitor 138 monitors the virtual world 114, respectively, for various events occurring within the social network 120 and virtual world 114, respectively. For example, the SCP monitor 136, operating with the virtual world monitor 138, can determine that an individual's contacts from the social network 120 are online in the virtual world 114 to enable a "teleport to social network contact" action. This action allows a user to teleport within the virtual world 114 to the location of his/her social network contact. The SCP monitor 136 can also monitor the social network 120 for notifications sent to a user in the social network 120 and cause these notifications to be provided to the user within the virtual world 114. Alternatively, the virtual world monitor 138, operating with SCP monitor 136, can determine that an individual's contacts from the virtual world 114 are online in the social network 120 and notify the user accordingly.

The social network connector 140 and the virtual world connector 142 provide an interface to the IMS 134 to which the IMS interfaces 118, 124 communicate. This allows for various actions being performed in the virtual world 114 and social network 120 to be monitored by the IMS 134 and/or performed on and/or linked to IMS server 112. For example, the social network connector 140 connects to the creation process of a Social Collaboration Platform (SCP) Identifier (ID) or a profile update operation being performed by the user in the social network 120. The virtual world connector 142, in one example, connects to the creation process of an avatar ID or a profile update operation being performed by a user in the virtual world 114. The IMS 134 is then able to link virtual world IDs and social network IDs to the same person. This information is stored within the database 144 as virtual world user information 146 and social network (SCP) user information 148. Also, the IMS 134 maintains all social network contact information for a user of the virtual world 114 in one or more databases 144. The social network and virtual world connectors 140, 142 also allow the IMS 134 to monitor the virtual world 114 and social network 120 infrastructures to manage relationships between avatars and between users of the social network 120. It should be noted that the IMS 134 and its components 136, 138, 140, 142 are discussed in greater detail below.

The database 144 also includes a Person table 150, Address table 152, Name table 154, Relationships table 156, Contact Details table 158, and System Keys table 160, which are used by a data model 300 (FIG. 3) for storing corresponding information. The Person, Address, Name, Relationships, Contact Details, and System Keys information stored in these tables 150, 152, 154, 156, 158, 160 are discussed in greater detail below with respect to FIG. 3.

As discussed above, the database 144 includes virtual world user information 146 and social network user information 148. The virtual world user information 146 and social network user information 148 includes information obtained from the virtual world 114 and the social network 120, respectively, associated with users of the virtual world 114 and the social network 120. In one embodiment, the virtual world user information 146 and social network user information 148 is obtained from the user information 116, 122 at the virtual world server 116 and the SCP server 106. Also, users of the virtual world 114 and the social network 120 when adding, deleting, changing, and/or creating user information for the virtual world 114 and/or social network 120 interact directly with the IMS 134. The virtual world user information 146 and social network user information 148 is discussed in greater detail below.

Linking Virtual Worlds with Social Collaboration Platforms

Figure 2:
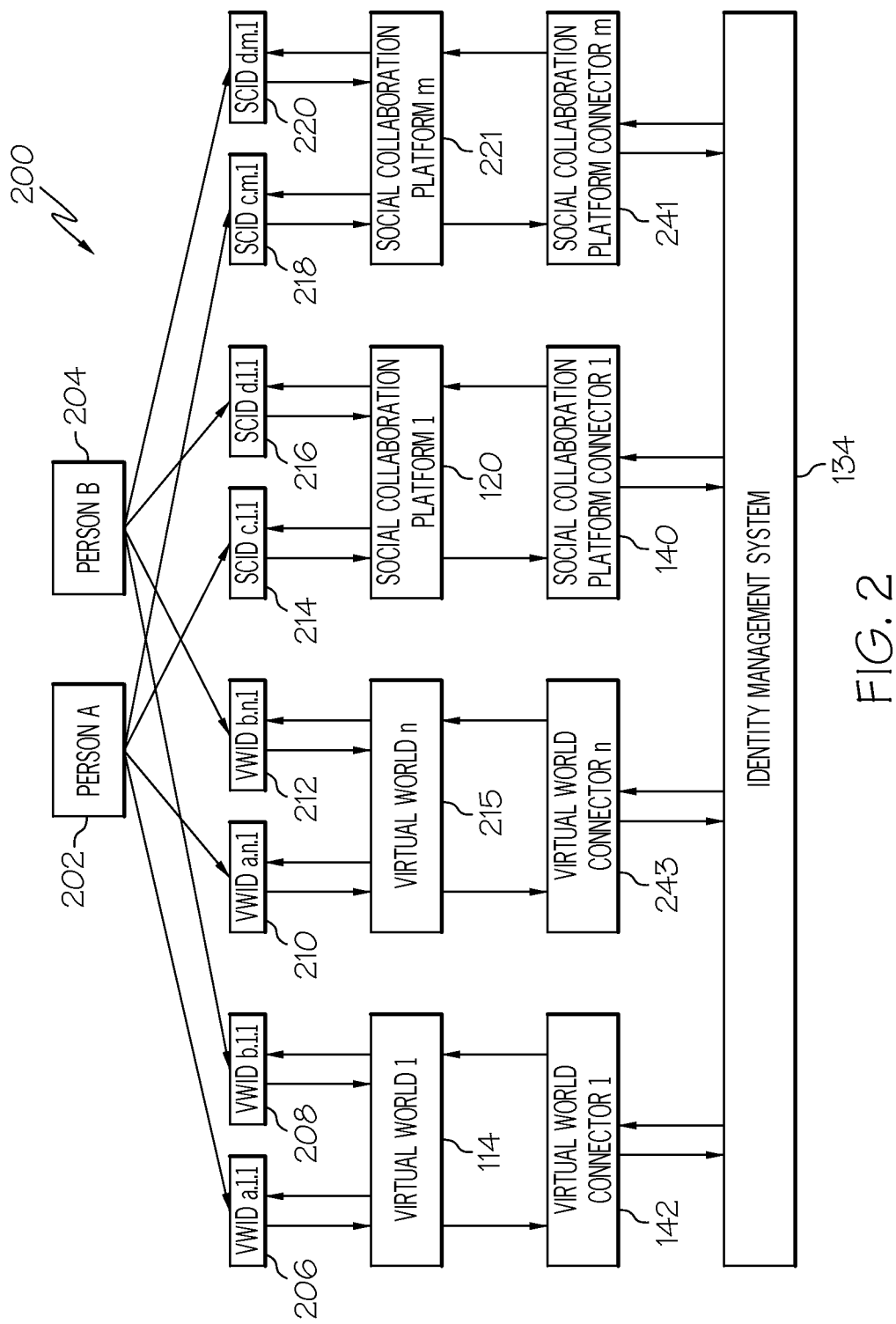
FIG. 2 is a block diagram showing a system architecture for the operating environment of FIG. 1 according to one embodiment of the present invention.

The following is a more detailed discussion regarding the IMS 134 and its components. FIG. 2 is a block diagram showing a system architecture 200 for the operating environment 100 of FIG. 1. In particular, FIG. 2 shows the IMS 134 communicatively coupled to a plurality of virtual world connectors 142, 243 and a plurality of social collaboration platform (social network) connectors 140, 241. Each of the virtual world connectors 142, 243 are communicatively coupled to a virtual world 114, 215. Each of the social collaboration platform connectors 140, 241 are communicatively coupled to a social network 120, 221.

A user 202, 204 is associated with a virtual world 114, 215 and therein is also associated with one or more virtual world IDs ("VWID") 206, 208, 210, 212. A user is a human being and represents a single entity in the real world. A user can have multiple identities associated with him or her in a virtual world and/or a social network. A person participates in a virtual world 114, 215 using an avatar. The unique identifier for an avatar is defined as the VWID 206, 208, 210, 212. An avatar that is known by another avatar is referred to as a contact. A profile for an avatar is a list of settings specific for that avatar, which is customizable by the person using the avatar. This profile, the VWIDs 206, 208, 210, 212, and contact information can be stored in the user information 116 at the virtual world server 104, the IMS server 112, and or a remote information processing system.

A user 202, 204 is also associated with a social network 120, 221. Each user 202, 204, for each social network 120, 221 associated therewith, is associated with a SPC identifier ("SCID") 214, 216, 218, 220. A user 202, 204 participates in a social network 120, 221 as a participant. The unique identifier for a participant is defined as the SCID 214, 216, 218, 220. A participant known by another participant in a social network 120, 221 is referred to as a contact. Participant profiles, the SCID 214, 216, 218, 220, and contact information can be stored in the user information 122 at the social collaboration platform server 106, the IMS server 112, and or a remote information processing system.

It should be noted that although FIG. 2 shows the architecture 200 only in the context of two users 202, 204 named Person A 202 and Person B 204, any number of users are applicable to the various embodiments of the present invention. Also, any user participating in a virtual world 114, 215 can have 1 to n avatars in that virtual world 114, 215. For simplicity, only 1 avatar per virtual world per person has been shown in FIG. 2. Any user participating in a social collaboration platform 120, 221 can have 1 to m participant IDs for that social collaboration platform 120, 221. For simplicity, only 1 participant per social collaboration platform has been shown in FIG. 2.

In the following discussion, across all virtual worlds 1 to n 114, 215 Person A 202 has a VWID collection that is each represented by a set of numbers in the pattern a.x.y. Person B 204 has the VWID collection that is each represented by a set of numbers in the pattern b.x.y. In these patterns, "x" represents a number corresponding to a particular virtual world in the range from 1 to n, and "y" is a unique identifier of the person's avatar in that virtual world. As discussed above, FIG. 2 only shows the case for y=1, which means only the first VWID of a person in that virtual world is given.

In the following discussion, across all social collaboration platforms 1 to m 120, 221, Person A 202 similarly has an SCID collection each represented by a set of numbers in the pattern c.x.y. Person B has an SCID collection each represented by a set of numbers in the pattern d.x.y. In these patterns, "x" represents a number of the social collaboration platform in the range from 1 to m, and "y" represents a unique identifier of the participant in that social collaboration platform. As discussed above, FIG. 2 only shows the case for y=1, which means only the first SCID of a person in that social collaboration platform is given.

In one embodiment, the IMS 134 collects information associated with the users 202, 204 through the social collaboration platform 120. For example, information such as real-world first and last name, address, contact details, email address etc., are obtained from the social collaboration platform 120. It should be noted that similar information can also be obtained through the virtual world 114, 215 as well. The IMS 134 can either obtain this information from the user information 116, 122 residing at the virtual world and SCP servers 104, 106 or monitor, via the SCP and virtual world monitors 136, 138, a user submitting this information to the virtual world and SCP servers 104, 106 and store a copy of this information as it is being submitted. This information is stored as the virtual world and social network information 146, 148 at the IMS server 112, respectively. The IMS 134 obtains this information from the social networks 120, 221 and/or the virtual worlds 114, 215 through the associated SCP connectors 214, 216, 218, 220 and the associated virtual world connectors 206, 208, 210, 214.

Initially, existing participant information (e.g., the identities of participants and any related information) of the social network 120, 215 is retrieved by the IMS 134 from the SCP server 106, or is received directly from the SCP server 106, and stored in the database 144 at the IMS server 112 as the SCP user information 148. After this initial loading process, any new (i.e., not already registered) participants on the social collaboration platforms 120, 221 are automatically registered with the IMS 134 in real-time (or at least near real-time) through the SCP connectors 214, 216, 218, 220. This allows for a participant ID that is stored in the IMS 134 that is associated with a particular user to be associated with that user's identifiers for the social collaboration platform and the virtual world. This association is able to be established and/or maintained, for example, while the user is creating and/or modifying the identifier in the social collaboration platform or the virtual world. In other words, a given user is able to have multiple identities stored within the IMS 134.

In one embodiment, a virtual world 114, 215 is able to revise its process of creating a new VWID in order to accommodate operations of the identity management system 134. In this embodiment, when a user 202, 204 creates a new VWID by creating a new avatar in a virtual world n 215, the virtual world system communicates with the IMS 134 via the virtual connector 243 associated with that virtual world 215 using the IMS interface 118 illustrated in FIG. 1. The virtual world 215 uses this IMS interface 118 and the virtual connector 243 to register this VWID for the person user 202, 204. In another embodiment, a virtual world 114, 215 is not able to revise its process of creating a new VWID to accommodate the identity management system 134. In such embodiments, the profile of an avatar can be changed to register the VWID in the IMS 134. Once the VWID is created according to the techniques used by the virtual world 114, the VWID is stored in the avatar profile where it can be seen. While the VWID is persisted in the avatar profile, the same persistency API of the profile used by the virtual world 114 is able to be modified in such a way, that changes in the profile are also routed through the virtual world connector 243 to be persisted in the IMS system 134. The VWID is stored in the virtual world user information in the database 144 at the IMS server 112. In other words, the VWID stored in the avatar's profile can be exported to the IMS 134 if the VWID generation process performed by the virtual world 114 cannot be changed.

Figure 3:
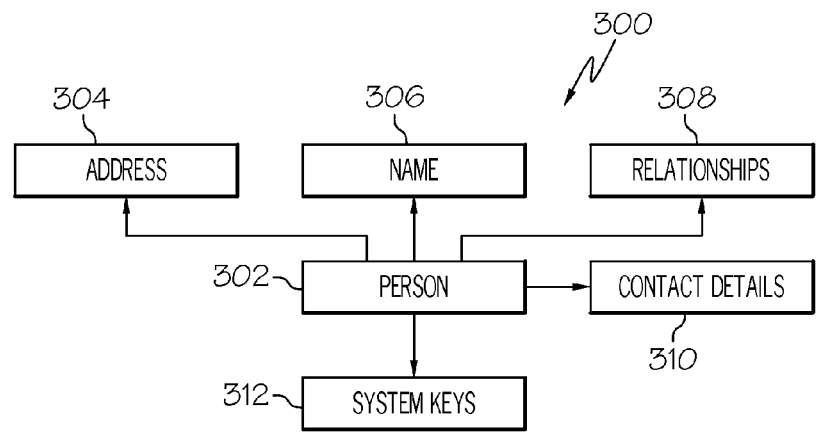
FIG. 3 shows one example of a data model used by the identity management system of FIG. 2 according to one embodiment of the present invention.

FIG. 3 shows one example of a data model 300 used by the IMS 134 for maintaining and managing information across virtual worlds 114, 215 and social networks 120, 221. In particular, the data model 300 includes the following entities: Person 302, Address 304, Name 306, Relationships 308, Contact Details 310, and System Keys 312. As discussed above, information associated with each of these entities 302, 304, 306, 308, 310, 312 are stored in a corresponding table 150, 152, 154, 156, 158, 160 in the database 144 of the identify management server 112.

The Person 302 entity comprises a unique identifier for a user/person and is related to all the other entities 304, 306, 308, 310, 312 using, for example, foreign keys in a relational database. A Person 302 can have multiple instances of Addresses 304, such as a primary residence and a summer residence. A Person 302 can also have multiple Names 306, such as a maiden name and a current last name. A Person 302 can have multiple Relationships 308 such as multiple relationships with different contacts on a social collaboration platform 120, 221.

It should be noted that in one embodiment relationships are established based on unique identifiers for persons and not for VWID or SCID. This allows the IMS 134 to easily retrieve all SCIDs and VWIDs for users/persons sharing a relationship based on a User/Person ID. However, the various embodiments of the present invention are not limited to this structure. A Person 302 can have multiple Contact Details 310 such as phone, SMS, and email numbers/identifiers. A Person 302 can have multiple System Keys 312, where a System Key 312 comprises the following attributes: User/Person ID (able to be implemented as a foreign key to Person table 150); System Identifier; Name for system (e.g., virtual world name or social network name); ID (either VWID or SCID); and optional additional attributes. The primary key for the System Key table 160 is given by User/Person ID, System Identifier, Name, ID. In other words, a user/person in one embodiment has only unique records in the System Keys table 160, one per either VWID or SCID.

Because the IMS 134 links the VWID to a given user 202, 204, the IMS 134 is able to (1) select a User/Person ID to which the VWID is associated; (2) create an entry in a System Keys table 312; (3) select for a particular User/Person ID all entries from a Relationships table 156; (4) for all User/Person IDs found through relationships, the IMS 134 selects all VWIDs from the System Keys table 160 with the same system identifier; and (5) return a list of VWIDs in the same virtual world representing contacts in a social collaboration platform or another virtual world where the contact also has at least one VWID in this virtual world. It should be noted that this list of VWIDs are the contacts for an avatar and is one of the inputs that the IMS 134 to allow, for example, a user in a virtual world to "teleport" to a social network contact that is also online in the virtual world.

Figure 4:
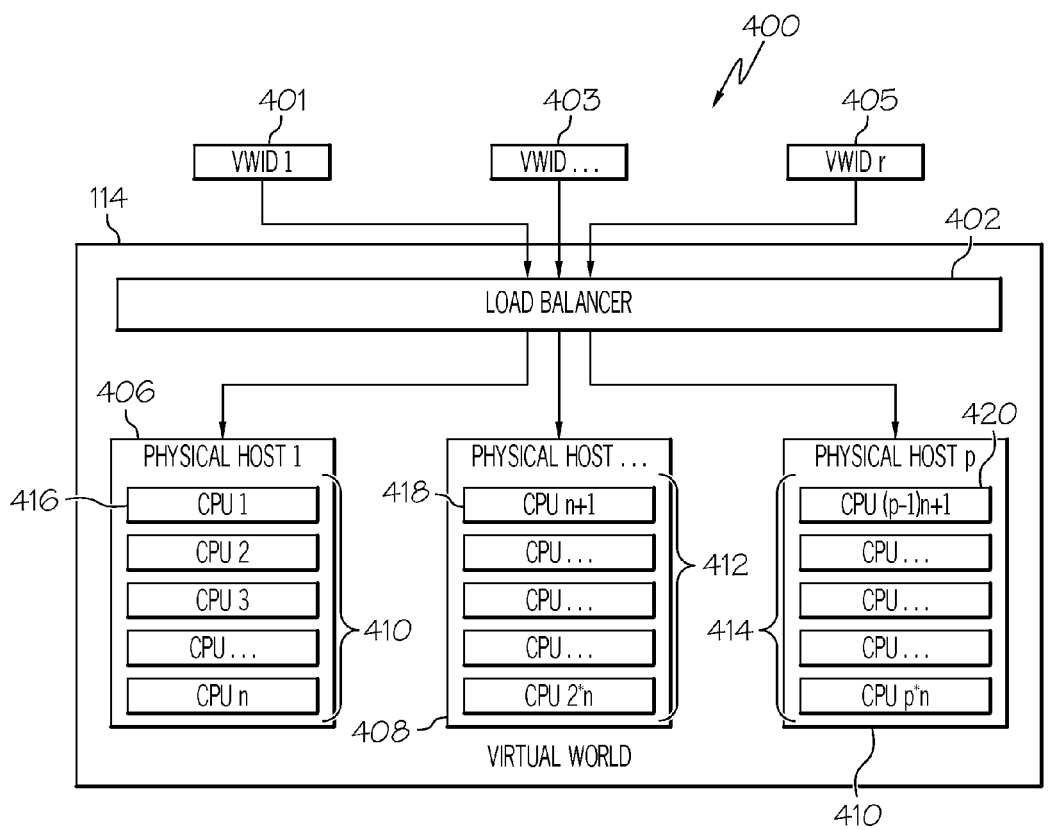
FIG. 4 shows a detailed view of a virtual world infrastructure according to one embodiment of the present invention.

The following is a more detailed discussion on the "teleporting" operation discussed above. For hosting a virtual world 114, 215 for a large number of users, the avatars identified through VWIDs 401, 403, 405 in the range from/to r is served by a virtual world 114, 215 deployed across a set of CPUs in one or more physical hosts as shown in FIG. 4. FIG. 4 shows a detailed view of a virtual world infrastructure 400. The infrastructure 400, in one embodiment, includes a virtual world 114 comprising a load balancer 402 and one or more physical hosts 404, 406, 408. Each of the physical hosts 404, 406, 408 includes a plurality 410, 412, 414 of CPUs 416, 418, 420.

In this embodiment, whenever a user/person 202, 204 logs onto the virtual world 114 the load balancer 402 launches the avatar for that user/person 202, 204 on the physical host 404, 406, 408 with the smallest load at the time. Within a physical host 404, 406, 408, one or more multiple CPUs 416, 418, 420 provide the processing cycles for running the avatar. In this embodiment, it is assumed for simplicity that each physical host 404, 406, 408 has the same number n of CPUs 416, 418, 420. However, the various embodiments of the present invention are not limited to this assumption.

Therefore, the IMS 134 is able to support this parallel processing infrastructure when displaying to a user 202, 204 in the virtual world 114 or for determining if other avatars associated with users/people that are contacts of the user 202, 204 in a social network 120 are online within the virtual world 114 and alternatively determining when virtual world contacts (e.g., a user's contacts within a virtual world) are online within the social network 120. Therefore, a list of contacts from a social network 120 that are online within the virtual world 114 can be displayed to the user 202, 204 so that the user 202, 204 can teleport to a location within the virtual world 114 where the online contact is located. Alternatively, a list of contacts from a virtual world 114 that are online within the social network 120 can be displayed to the user 202, 204 in the social network 120.

The following are key identifiers that the IMS 134 uses when performing this operation: r denotes the overall number of online avatars in the virtual world 114; p denotes the overall number of physical hosts 404, 406, 408 which each have n CPUs; q=p*n denotes the overall number of available CPUs 416, 418, 420 for running the virtual world 114. In addition to the above parameters the following are additional inputs used by the IMS 134: login flag=L indicates that a given VWID is logged on to the virtual world 114: a list of VWIDs contacts, which is a list of VWIDs in the same virtual world representing contacts in a social collaboration platform or another virtual world where the contact also has at least one VWID in this virtual world; parameter p4, which indicates how often VWID is to be included in the determination as to whether contacts are online; parameter p1, wherein p1=yes if VWID is to be included in computation of active contacts: parameter p2, which indicates for a given virtual world how frequently the list of VWID contacts is to be refreshed from the IMS 134; parameter p3, which indicates for a given virtual world how frequently the online contact determination operation is to be performed.

Table 1 below shows pseudo code for the online contact determination process.

TABLE 1

Repeat every p3 time units
1. Check Distribution and re-distribute VWIDs to CPUs
2. in a parallel step on each CPU do: Result List 1 = Retrieve list of VWID where login flag = L AND p1 = yes
3. in a parallel step on each CPU do: Result List 2 = Remove from Result List 1 all VWID if p4 is not reached since last inclusion in determination of active VWIDs
4. in a parallel step on each CPU do: Result List 3 = For each VWID in Result List 2 if p2 is reached, refresh list of VWID contacts
5. For each VWID in Result List 3, check for all VWIDs in contact list for current VWID if VWID is found in Result List 1

As can be seen, the online contact determination operation in this example is performed by the IMS 134 every p3 time units. For each execution of the online contact determination operation, the total number of registered VWIDs is retrieved from IMS 134. Then two checks are made by the IMS 134. First, the IMS 134 determines whether the number of VWIDs distributed across the hosts for the parallel algorithm is the same as the number of VWIDs found in IMS 134. Differences in these numbers is possible in one embodiment because new users may have registered new VWIDs or deleted old ones since the last run. Secondly, the IMS 134 determines if the number of VWIDs distributed to each CPU 416, 418, 420 is equal, or if a redistribution is needed to have the same number (modulo rest) on each CPU or node. If redistribution is needed, then VWIDs are redistributed among the CPUs 416, 418, 420. In a parallel operation on each CPU 416, 418, 420 the IMS 134 generates a Result List 1, which comprises a list of VWIDs having a login flag=L and p1=yes. In other words, the IMS identifies from the table information 150 to 160 VWIDs that are logged onto the virtual world 114 and that are to be included in the computation of active contacts.

In another parallel operation on each CPU 416, 418, 420 the IMS 134 generates a Result List 2. When generating Result List 2 the IMS 134 removes from Result List 1 each VWID for which p4 has not been reached since its last inclusion in the determination of active VWIDs. In other words, the IMS 134 removes from the Result List 1 any VWID that has exceeded the number of times allotted for that VWID for being included in determining if contacts are online. In another parallel operation for each CPU 416, 418, 420 the IMS 134 generates a Result List 3. Result List 3 is generated by determining for each VWID in Result List 2 if p2 has been reached and if so, refreshing the list of VWID contacts. The IMS 134 then checks for all VWID in the contact list (Result List 3) for a current VWID of each VWID if a VWID in Result List 3 is found in Result List 1.

Figure 5:
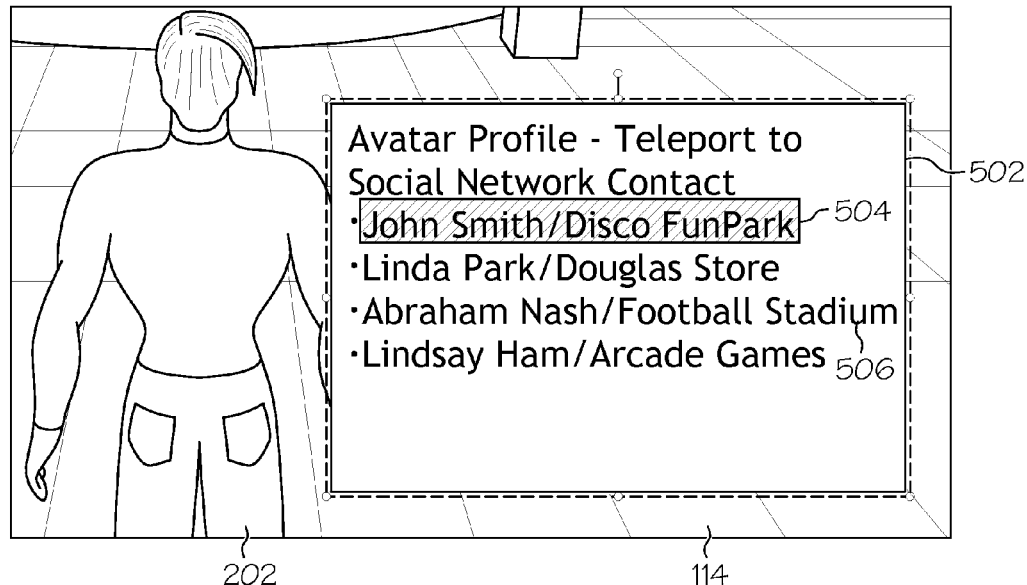
FIG. 5 shows an example of displaying a contact list comprising social network contacts that are online in a virtual world to a user in the virtual world according to one embodiment of the present invention.

The IMS 134 then outputs a list of online contacts that a user 202, 204 within the virtual world 114 can teleport to. FIG. 5 shows an example of displaying this list of contacts 502 to a user 202 in a virtual world 114. In particular, FIG. 5 shows a user 202 within a virtual world 114. A list of contacts 502 is displayed to the user 202 that indicates which of the user's social network contacts are online within the virtual world 114.

FIG. 5 shows that the user 202 has selected a contact 504. The user 202 is then able to teleport to the location within the virtual world 114 where this selected contact 504 is. In other words, the user 202 is relocated at the location where the selected contact 504 is located. It should be noted that in addition to the name 506 of the contact the location 508 of the contact 504 is also shown. This allows the user 202 immediately determine if the user 202 would like to go teleport to the location of the contact 504 based upon, for example, the type of location. In the illustrated example, contacts are shown to be located at "Disco FunPark," "Douglas Store," "Football Stadium," and "Arcade Games." Based upon the type of activity user 202 would like to participate in, the user 202 is able to teleport to a contact at a desired type of location.

In addition to determining when social network contacts of a user in a virtual world 114 are online in the virtual world 114, the IMS 134 also presents notifications to a user within a virtual world 114 from the social network 120. In this embodiment, the IMS 134, via the SCP monitor 136, monitors events in a social network 120 associated with a user 202 online in a virtual world 114. Alternatively, the social network 120 queries the IMS 134 to determine if a user associated with the event is online in a virtual world 114. Events within a social network 120 can include messages sent to the user 202 within the social network 120, subscribed to topic events, postings, etc.

Figure 6:
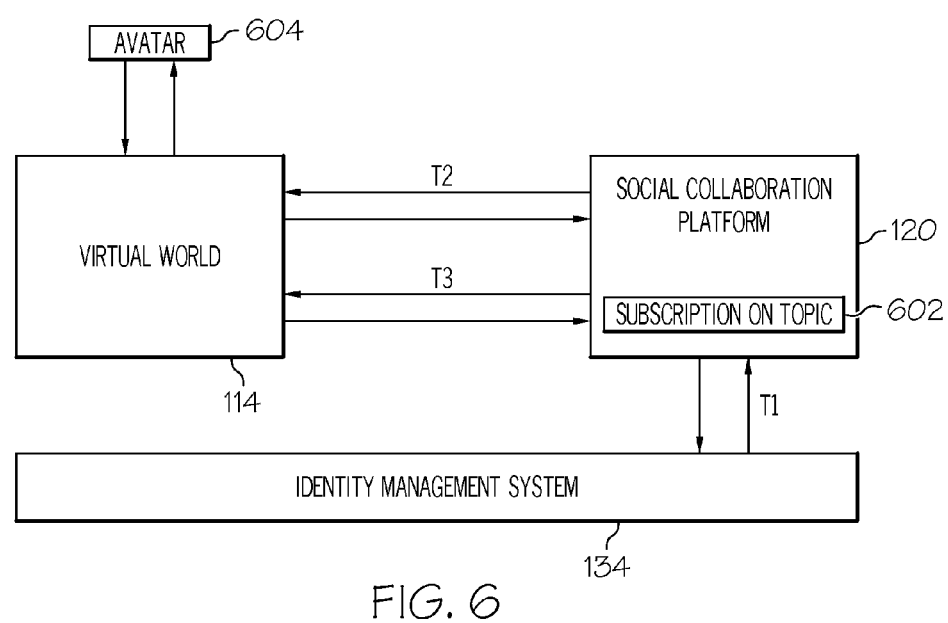
FIG. 6 is a transactional flow diagram illustrating one example of notifying a user in a virtual world of a social network event according to one embodiment of the present invention.

The following is an example of notifying a user 202 while online in a virtual world 114 when a social network 120 event has occurred and is discussed with respect to FIG. 6. In one embodiment, a user 202 has subscribed to a topic 602 on a social network 120. An event occurs related to the subscribed to topic 602 and at the time of the event occurrence the user 202 is using an avatar 604 in the virtual world 114. When the event occurs, the social network 120, at time T1, calls a service via the IMS interface 124 from the IMS 134 to check if the person 202 to be notified also has registered avatar IDs in a virtual world 114. If not, the usual notification mechanism (e.g. email to an email address or any other normal communication mechanism) is used. However, if the person 202 does have one or more avatar IDs registered, the virtual world monitor 123 at the social network 120, at time T2, communicates with the virtual world 114 to determine if the avatar associated with the person 202 is online in the virtual world 114. If not, the usual notification mechanism (e.g. email to an email address or any other normal communication mechanism) is used.

It should be noted that the social network 120 is not required to communicate with the virtual world 114. For example, the IMS 134 can maintain the required information such as whether a given avatar associated with a given person 202 is online in a given virtual world 114. In such embodiments, the social network 120 via the interface 124 communicates with the IMS 134 to determine if the avatar associated with the person 202 is online in the virtual world 114. If the avatar 604 is online in the virtual world 114 then the social network 120 via the virtual world monitor 123, at time T3, transmits the notification to the avatar in the virtual world 114. It should be noted that the social network 120 is not required to communicate with the virtual world 114. For example, the IMS 134 can receive via the SCP connector 140 or retrieve the notification from the social network 120. The IMS 134 can then send this notification to the avatar in the virtual world 114 via the virtual world connector 142.

Figure 7:
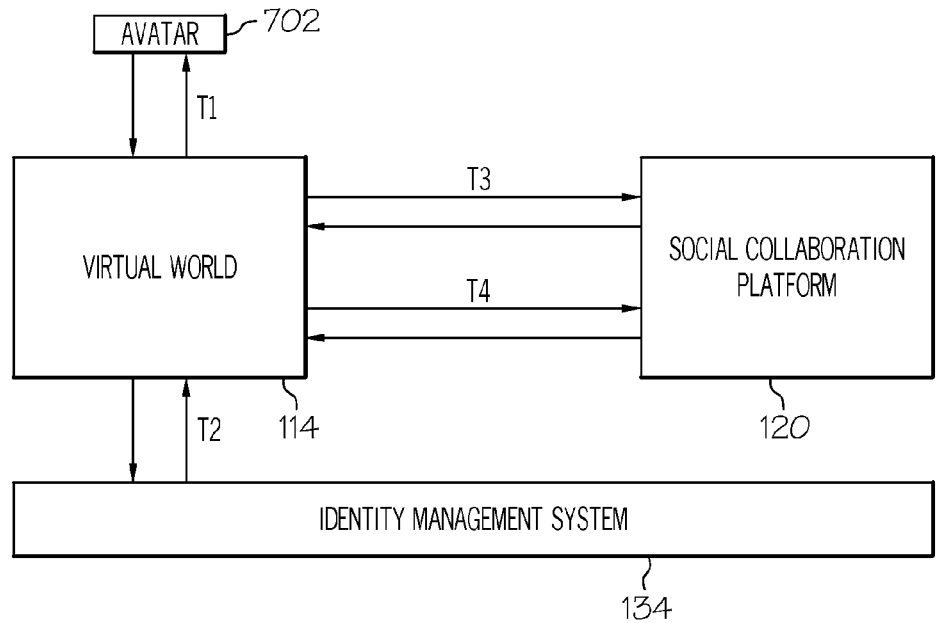
FIG. 7 is a transactional flow diagram illustrating a transactional flow illustrating one example of sending information generated within a virtual world to a social network according to one embodiment of the present invention.

In yet another embodiment, a user 202 is able to post information from the virtual world 114 to the social network 120. For example, a user 202 can post meeting minutes from a meeting within the virtual world 114 to the social network 120. FIG. 7 is a transactional flow diagram illustrating a transactional flow for when a user 202 using an avatar 702 wants to push out information from the virtual world 114 to a social network 120. In this embodiment, an avatar 702, at time T1, selects as part of the virtual meeting in a virtual world 114 the option to create meeting minutes. The virtual world 114, via the virtual world interface 126 and the virtual world connector 142, at time T2, communicates with the IMS 134 to determine all social networks 120, 215 wherein the user 202 playing the avatar 702 is registered with the capability to receive information such as meeting minutes. If a capable social network 120, 221 is not identified the avatar 702, the user 202 is notified that this option is unavailable.

If at least one (or more) capable social networks 120, 221 are identified, the user 202 playing the avatar 702 selects one or more of these social networks 120, 221 to where the information such as meeting minutes is to be sent. The virtual world 114, at time T3, via a social network monitor 117 invokes a service session with the social network 120, 221 that has been selected. This service session allows for the information to be pushed from the virtual world 114 to the social network 120, 221. The person playing the avatar 702, at time T4, selects an option that indicates the creation of the information is completed, the service session between the virtual world 114 and the social network(s) 120, 221 is closed, thereby triggering a push of the information from the virtual world 114 to the social network(s) 120, 221.

In yet another embodiment, the IMS 134 indicates to a user 202 whether another avatar within the virtual world 114 is a trusted identity. For example, avatar appearances can be changed by the person playing the avatar. In addition if a user 202 meets a new avatar claiming that the person playing the avatar knows the user 202 from a social network 120, this claim may not be sufficient to establish trust. In other words if a user's avatar is invited or if a user using his/her avatar invites another avatar into a private room to share items such as personal pictures or information, the user or users want to know if the player of the other avatar is the identity claimed. Therefore, the IMS 134 indicates to a user 202 within a virtual world whether other avatars within the virtual world are trusted.

Figure 8:
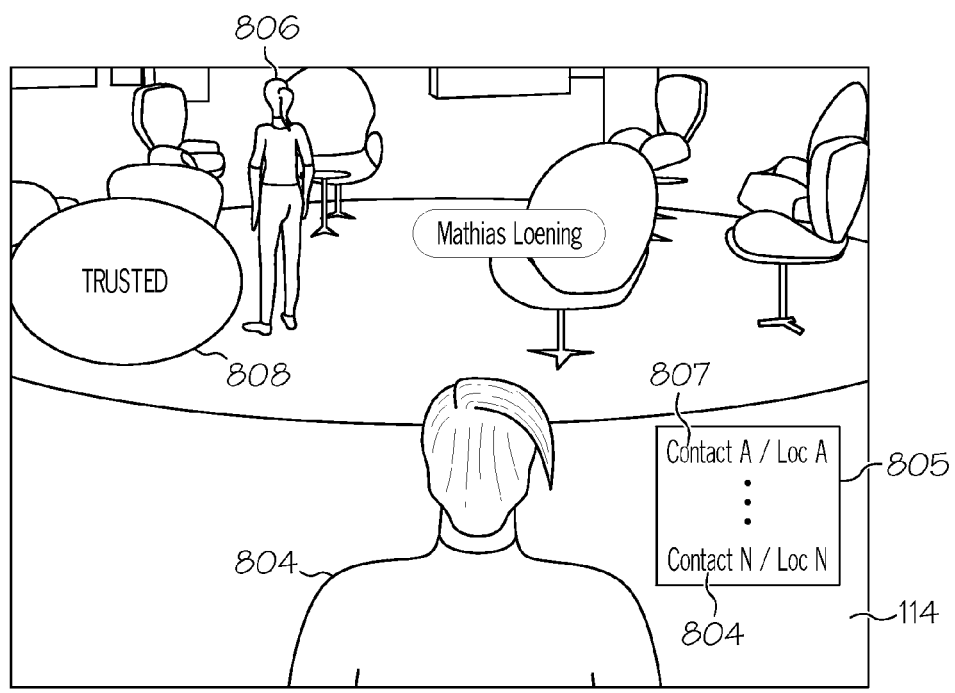
FIG. 8 shows an example of displaying to a user within a virtual world an identity status of another user within that virtual world according to one embodiment of the present invention.

For example, FIG. 8 shows an example of a virtual world 114 comprising a user's avatar 804 and another avatar 806 within the virtual world 114. As can be seen, the virtual world 114 displays an indicator 808 next to each avatar 806 within view of the user's avatar indicating whether or not this avatar 806 is trusted. In other words, the virtual world 114 displays an indicator 808 next to each avatar 804 indicating whether the other avatar 806 is known contact from a social network 120 where the user and the other person playing the other avatar 806 have previously met. Any indicating mechanism can be used such as a window with a list of avatars comprising an indication of "trusted" or "not trusted". Also, the various embodiments of the present invention are not limited to only displaying "trust" information for avatars within view of the user's avatar.

Also, the user can be shown a list of social network contacts 805 that are online within the virtual world 114. The list 805 can include a contact's identifier 807 and a contact's current location 809 within the virtual world 114. The user can then select one of these contacts 807 and be relocated the contact's current location within the virtual world 114. It should be noted that the various embodiments of the present invention are not limited to the example shown in FIG. 8. Alternatively, a similar list can be displayed to the user in the social network 120. This list can include a virtual world contact's identifier in the social network. It should be noted that the locations 809 of the user's social network contacts within the virtual world 114 can also be displayed to the other user's virtual world contacts and/or the other social network contacts.

In one embodiment, a user 202 playing the avatar 804 is given an option via a menu or some other mechanism to trigger identity verification. In another embodiment, identity verification occurs automatically and without user intervention whenever avatars enter a private room or any other area in a virtual world 114. The result of the verification can be visible to all players of avatars entering a private room to establish mutual trust. The following example only uses 2 avatars, but the various embodiments are applicable to any number of avatars. With respect to the embodiment where the user is given an option to initiate identity verification, either one of the players A or B of an avatar can initiate the verification process using the context menu of the avatar. This triggers the virtual world to initiate communication with the IMS 134 through the virtual world connector 118. The IMS 134, for the avatar requesting identity verification, determines if avatar A and B have at least one collaboration platform in common using the information in the tables 150, 152, 154, 156, 158, 160. If there are more than 2 avatars, this check is performed for each pair of involved avatars. If the check succeeds in all cases, the icon "trusted" is set when the answer from the IMS 134 reaches all involved avatars in the virtual world. If the check fails, the icon "Non-Trusted" is set so that the players could decide to not enter the private meeting room.

Operational Flow Diagrams

Figure 9:
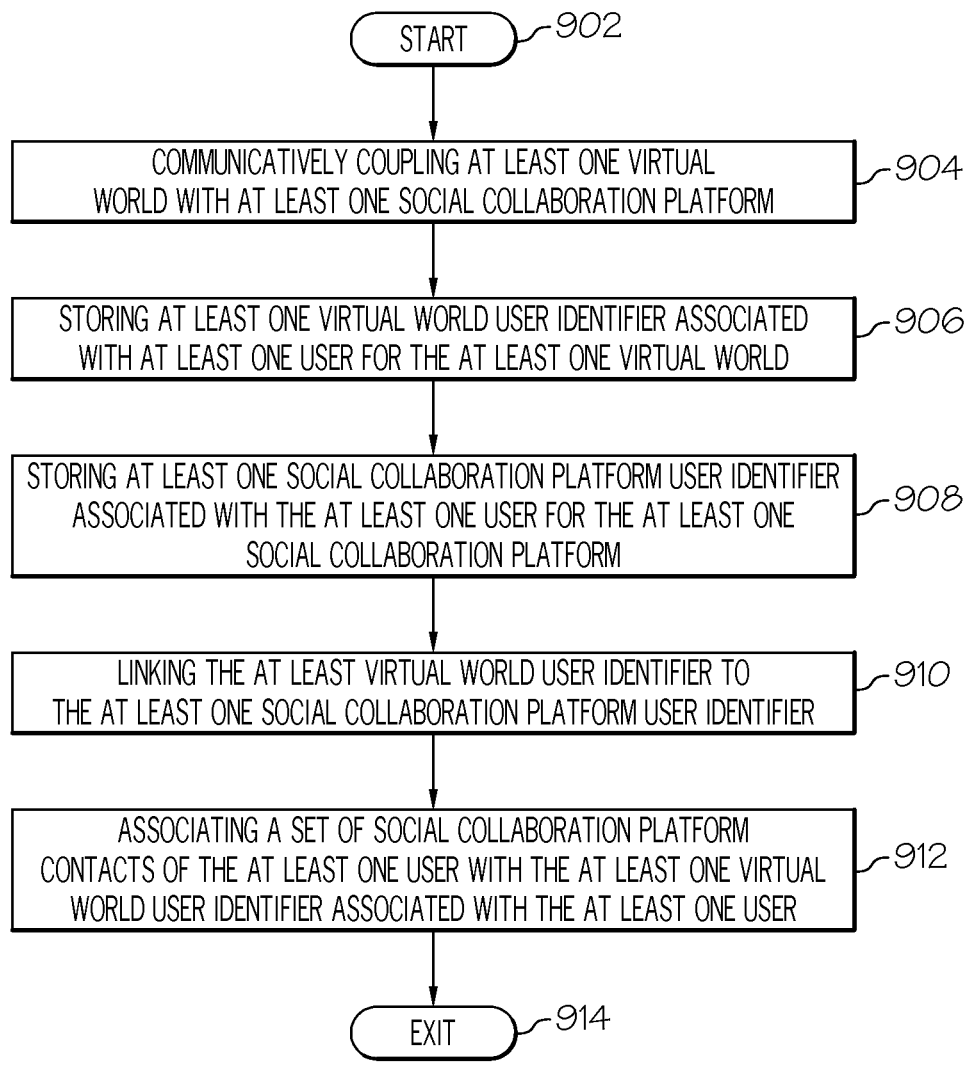
FIG. 9 is an operational flow diagram illustrating one example of a general process for bi-directionally linking a virtual world with a social collaboration platform according to one embodiment of the present invention.

FIG. 9 is an operational flow diagram illustrating one example of a general process for bi-directionally linking a virtual world with a social collaboration platform. The operational flow diagram of FIG. 9 begins at step 902 and flows directly into step 904. The IMS 134, at step 904, communicatively coupled at least one virtual world 114 with at least one SCP 120. The IMS 134, at step 906, stores at least one virtual world user identifier associated with at least one user for the at least one virtual world 114 in a memory 144.

The IMS 134, at step 908, stores at least one SCP user identifier associated with the at least one user for the at least one SCP 120 in a memory 144. The IMS 134, at step 910, links the at least one virtual user identifier to the at least one SCP user identifier. The IMS 134, at step 912, associates a set of SCP contacts of the at least one user with the at least one virtual world user identifier. The same can be done for virtual world contacts when the user is interacting with a social network 120. The control flow then exits at step 914.

Figure 10:
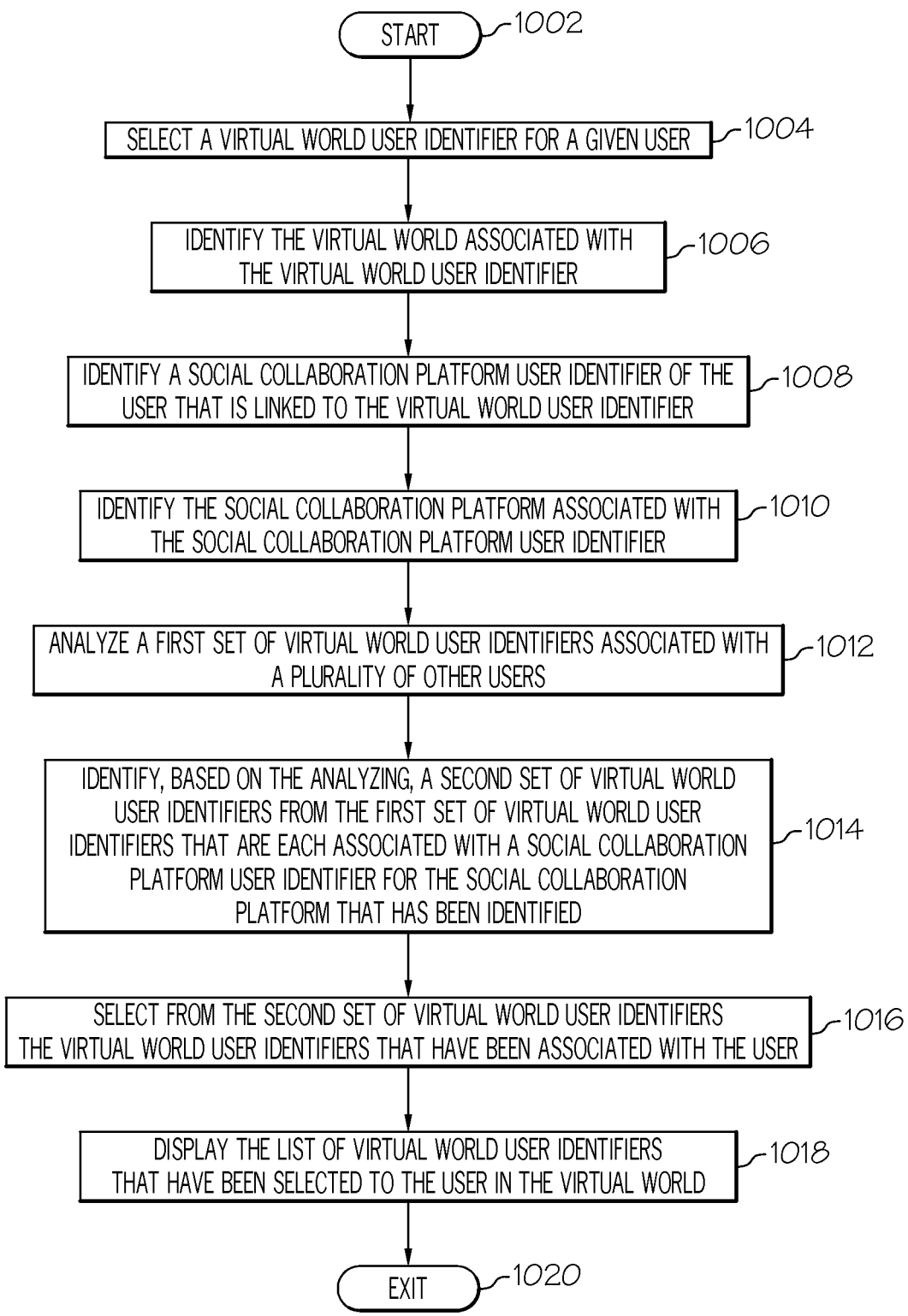
FIG. 10 is an operational flow diagram illustrating one example of determining social network contacts for a user within a virtual world according to one embodiment of the present invention.

FIG. 10 is an operational flow diagram illustrating one example of determining SCP contacts for a user within a virtual world. The operational flow diagram of FIG. 10 begins at step 1002 and flows directly into step 1004. The IMS 134, at step 1004, selects a virtual world user identifier for a given user. The IMS 134, at step 1006, identifies the virtual world 114 that is associated with the virtual world user identifier.

The IMS 134, at step 1008, identifies a SCP user identifier of the user that is linked to the virtual world user identifier. The IMS 134, at step 1010, identifies the SCP 120 that is associated with the SCP user identifier. The IMS 134, at step 1012, analyzes a first set of virtual world user identifiers that are associated with a plurality of other users. The IMS 134, at step 1014, identifies, based on the analyzing, a second set of virtual world user identifiers from the first set of virtual world user identifiers. Each identifier in the second set of identifiers is associated with a SCP user identifier for the SCP 120 that has been identified. The IMS 134, at step 1016, selects from the second set of virtual world user identifiers the virtual world user identifiers that have been associated with the user (e.g., are contacts of the user in an SCP). The IMS 134, at step 1018, displays the list of virtual world user identifiers that have been selected to the user in the virtual world. It should be noted that the location of the avatars associated with these identifiers can also be displayed. A user is then able to select one of the contacts and have his/her avatar relocated at the location of the selected contact within the virtual world 114. This same process can be done for determining virtual world contacts for a user within a social network 120. The control flow then exits at step 1020.

Figure 11:
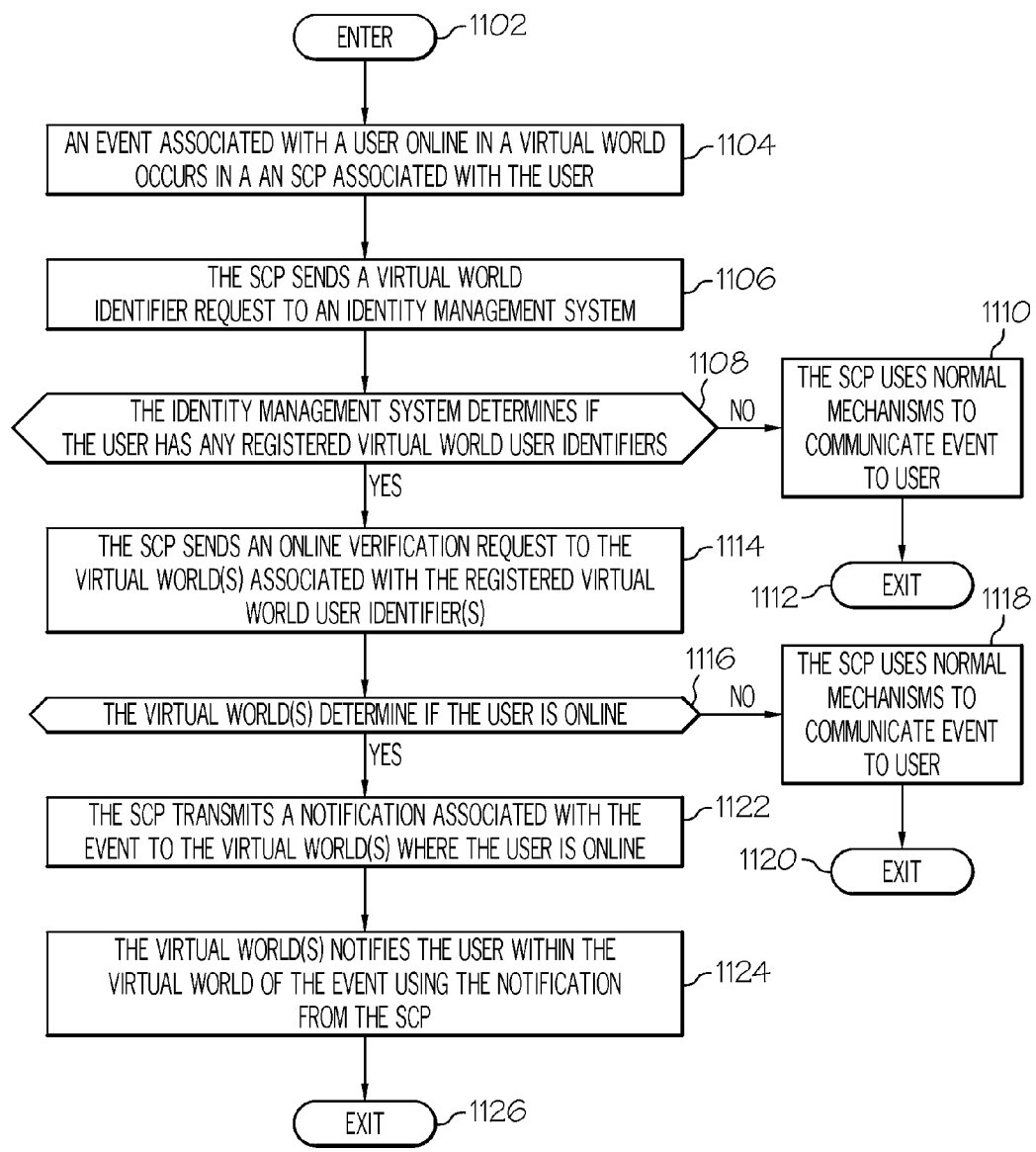
FIG. 11 is an operational flow diagram illustrating one example of notifying a user online in a virtual world of an event that has occurred in a social network associated with that user according to one embodiment of the present invention.

FIG. 11 is an operational flow diagram illustrating one example of notifying a user online in a virtual world of an event that has occurred in a SCP associated with that user. The operational flow diagram of FIG. 11 begins at step 1102 and flows directly into step 1104. An event, at step 1104, that is associated with a user online in a virtual world 114 occurs in an SCP 120 associated with the user. The SCP 120, at step 1106, sends a virtual world identifier request to the IMS 134. The IMS 134, at step 1108, determines if the user has any registered virtual world user identifiers. If the result of this determination is negative, the SCP 120, at step 1110, uses normal communication mechanisms to communicate the event to the user. The control flow then exits at step 1112.

If the result of this determination is positive, the SCP 120, at step 1114, sends an online verification request to the virtual world(s) 114 associated with the registered virtual world use identifier(s) identified by the IMS 134. The virtual world(s) 114, at step 1116, determines if the user is online. If the result of this determination is negative, the SCP 120, at step 1118, uses normal communication mechanisms to communicate the event to the user. The control flow then exits at step 1120.

If the result of this determination is positive, the SCP 120, at step 1122, transmits a notification associated with the even to the virtual world(s) 114 where the user is online. The virtual world(s) 114 notifies the user within the virtual world 114 of the event using the notification received from the SCP 120. The control flow then exits at step 1126.

Figure 12:
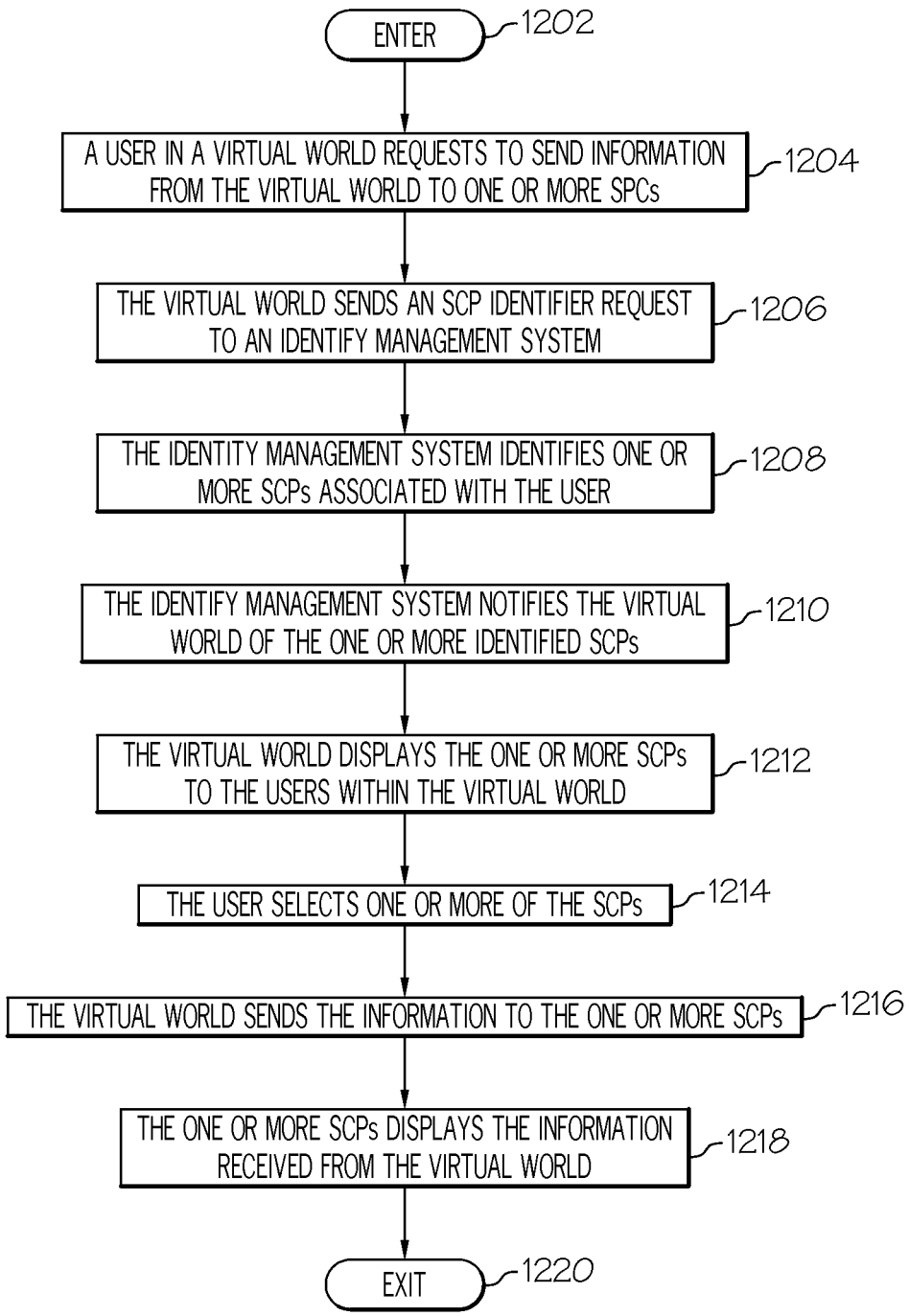
FIG. 12 is an operational flow diagram illustrating one example of sending information generated within a virtual world from the virtual world to a social network according to one embodiment of the present invention.

FIG. 12 is an operational flow diagram illustrating one example of sending information generated within a virtual world from the virtual world to a SCP. The operational flow diagram of FIG. 12 begins at step 1202 and flows directly into step 1204. A user in a virtual world 114, at step 1204, requests to send information from the virtual world 114 to one or more SCPs 120. The virtual world 114, at step 1206, sends an SCP identifier request to the IMS 134. The IMS 134, at step 1208, identifies one or more SCPs associated with the user.

The IMS 134, at step 1210, notifies the virtual world 114 of the one or more identified SCPs 120. The virtual world 114, at step 1212, displays the one or more SCPs 120 to the user within the virtual world 114. The user, at step 1214, selects one or more of the displayed SCPs 120. The virtual world 114, at step 1216, sends the information to the one or more SCPs 120 that have been selected by the user. The one or more SCPs 120, at step 1218, that have received the information from the virtual world 114 display the information within the SCP 120. The control flow then exits at step 1220.

Figure 13:
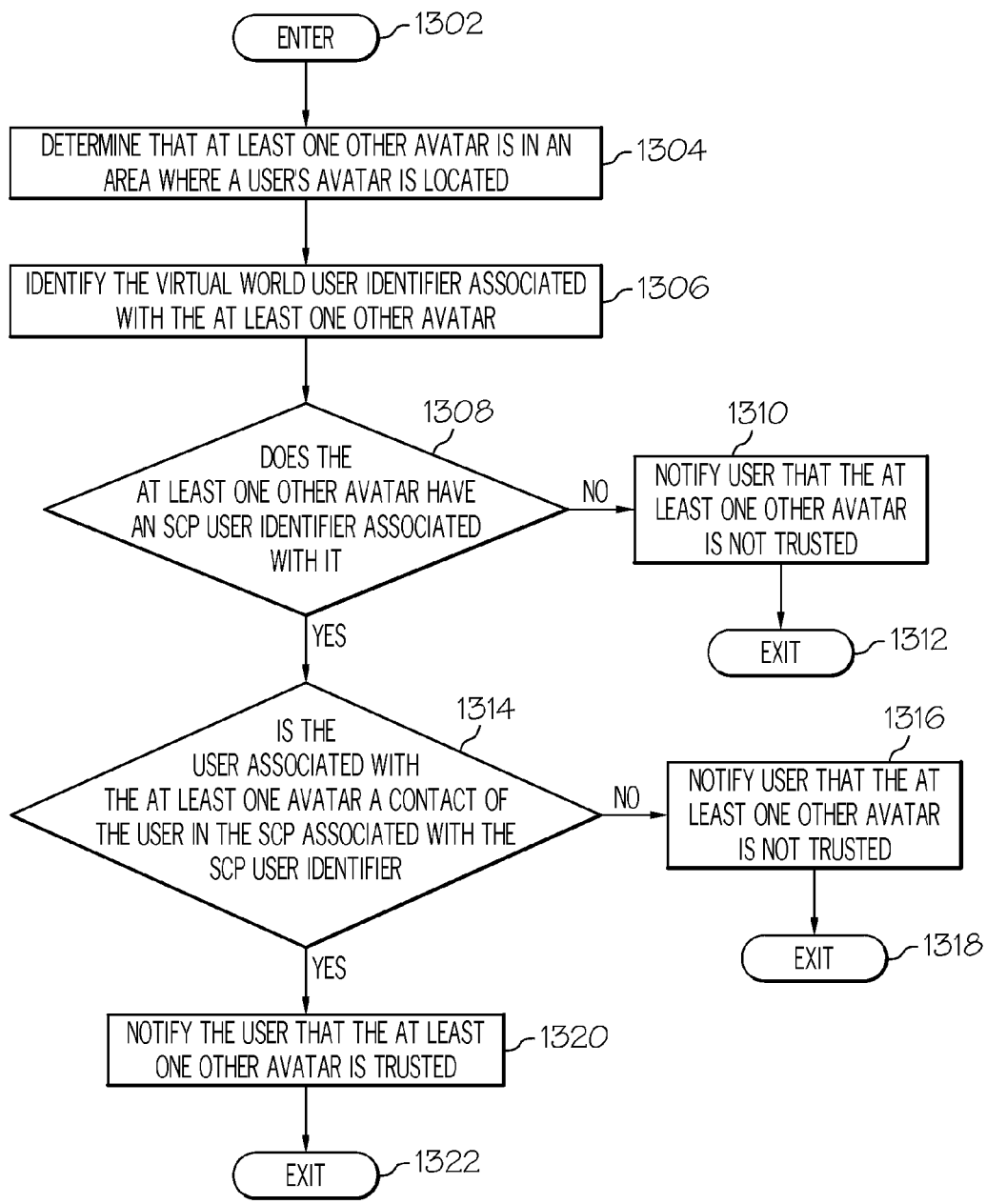
FIG. 13 is an operational flow diagram illustrating one example of verifying the identify of avatars within a virtual world according to one embodiment of the present invention.

FIG. 13 is an operational flow diagram illustrating one example of verifying the identity of avatars within a virtual world. The operational flow diagram of FIG. 13 begins at step 1302 and flows directly into step 1304. The IMS 134, at step 1304, determines that at least one other avatar is in an area of a virtual world 114 where a user's avatar is located. The IMS 134, at step 1306, identifies the virtual world user identifier associated with the at least one other avatar. The IMS 134, at step 1308, determines if the at least one other avatar has an SCP user identifier associated with it. If the result of this determination is negative, the IMS 134, at step 1310, notifies the user that the at least one other avatar is not trusted. The control flow then exits at step 1312.

If the result of this determination is positive, the IMS 134, at step 1314, determines if the user associated with the at least one other avatar is a contact of the user in the SCP 120 associated with the SCP user identifier. If the result of this determination is negative, the IMS 134, at step 1316, notifies the user that the at least one other avatar is not trusted. The control flow then exits at step 1318. If the result of this determination is positive, the IMS 134, at step 1320 notifies the user that the at least one other avatar is trusted. The control flow then exits at step 1322.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 14:
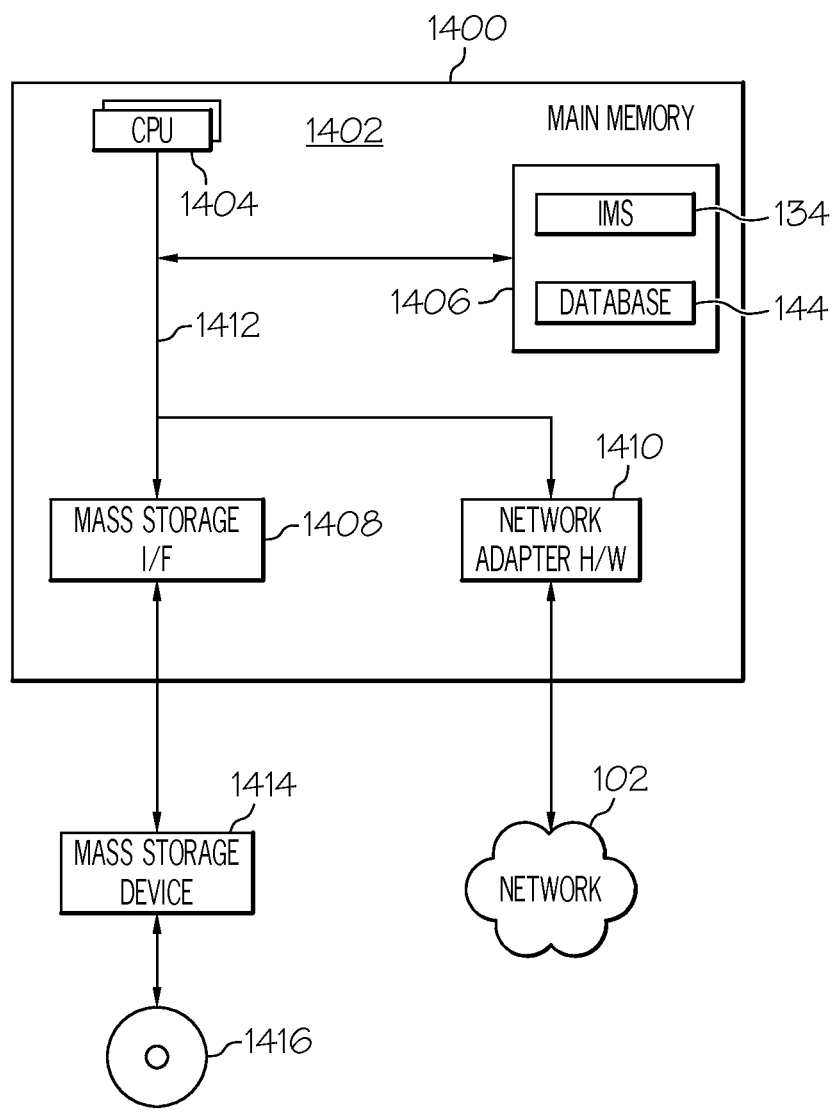
FIG. 14 is a block diagram illustrating a more detailed view of an information processing system according to one embodiment of the present invention.

Referring now to FIG. 14, which is a block diagram illustrating a more detailed view of an information processing system 1400 that can be utilized in the operating environment 100 discussed above with respect to FIG. 1. The information processing system 1400 is based upon a suitably configured processing system adapted to implement one or more embodiments of the present invention. Similarly, any suitably configured processing system can be used as the information processing system 1400 by embodiments of the present invention.

The information processing system 1400 includes a computer 1402. The computer 1402 has a processor(s) 1404 that is connected to a main memory 1406, mass storage interface 1408, and network adapter hardware 1410. A system bus 1412 interconnects these system components. The main memory 1406, in one embodiment, includes IMS 134 and its components discussed above with respect to FIG. 1. The main memory 1406 can also include the database 144 and its components discussed above with respect to FIGS. 1 and 3.

Although illustrated as concurrently resident in the main memory 1406, it is clear that respective components of the main memory 1406 are not required to be completely resident in the main memory 1406 at all times or even at the same time. In one embodiment, the information processing system 1400 utilizes conventional virtual addressing mechanisms to allow programs to behave as if they have access to a large, single storage entity, referred to herein as a computer system memory, instead of access to multiple, smaller storage entities such as the main memory 1406 and data storage device 1416. Note that the term "computer system memory" is used herein to generically refer to the entire virtual memory of the information processing system 1406.

The mass storage interface 1408 is used to connect mass storage devices, such as data storage device 1414, to the information processing system 1400. One specific type of data storage device is an optical drive such as a CD/DVD drive, which may be used to store data to and read data from a computer readable medium or storage product such as (but not limited to) a CD/DVD 1416. Another type of data storage device is a data storage device configured to support, for example, NTFS type file system operations.

Although only one CPU 1404 is illustrated for computer 1402, computer systems with multiple CPUs can be used equally effectively. Embodiments of the present invention further incorporate interfaces that each includes separate, fully programmed microprocessors that are used to off-load processing from the CPU 1404. An operating system (not shown) included in the main memory is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 1400. The network adapter hardware 1410 is used to provide an interface to a network 102. Embodiments of the present invention are able to be adapted to work with any data communications connections including present day analog and/or digital techniques or via a future networking mechanism.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. An information processing system for linking a virtual world information with a social collaboration platform information, the information processing system comprising:
   a computer memory device capable of storing machine instructions; and
   a processor communicatively coupled to the computer memory, the processor configured to access the computer memory and further configured to:
      store, automatically and without user intervention, a virtual world user identifier that identifies a respective user of a plurality of users in at least one virtual world, the virtual world identifier being associated with a contact list comprising a set of one or more virtual world contacts of the respective user,
         wherein each contact in the set of one or more virtual world contacts represents an avatar of another user of the at least one virtual world that is known by the respective user in the at least one virtual world, and
         wherein a unique virtual world identifier associated with each contact in the set of one or more virtual world contacts is stored within a set of user information of the respective user at the virtual world;
      store, automatically and without user intervention, a social collaboration platform user identifier that identifies the respective user in a social collaboration platform, the social collaboration platform user identifier being associated with a set of one or more social collaboration contacts for the respective user,
         wherein each contact in the set of one or more social collaboration contacts represents a participant in the a social collaboration platform that is known by the respective user in the a social collaboration platform, and
         wherein a unique social collaboration platform identifier associated with each contact in the set of one or more social collaboration contacts is stored within a set of user information of the respective user at the social collaboration platform;
      obtain, automatically and without user intervention, at least one of the set of one or more virtual contacts from the set of user information of the respective user at the virtual world and the set of one or more social collaboration contacts from the set of user information of the respective user at the social collaboration platform, for the respective user;
      link, automatically and without user intervention, in response to the virtual world and social collaboration platform identifiers being stored, the virtual world user identifier to the social collaboration platform user identifier,
         wherein the linking comprises associating the virtual world user identifier and the social collaboration platform user identifier to a unique identifier associated with the respective user in a data model,
         wherein the unique identifier is separate and distinct from the virtual world user identifier and the social collaboration platform user identifier;
      determine, automatically and without user intervention, based on the linking, an association between at least one of
         each social collaboration contact of the set of one or more social collaboration contacts that has been obtained and the virtual world identifier of the respective user, and
         each virtual world contact of the set of one or more virtual world contacts that has been obtained and the social collaboration platform user identifier of the user;
      identify, automatically and without user intervention, an information set associated with at least one of the virtual world user identifier and the social collaboration identifier based on the unique identifier, the information set being at least one of the set of one or more social collaboration contacts and the set of one or more virtual world contacts; and
      update, automatically and without user intervention based on in response the identifying, the information set to include the association that has been determined, wherein the information set enables the user to perform at least one of the following:
         bi-directionally interact with the set of one or more social collaboration contacts from the at least one virtual world, or
         bi-directionally interact with the set of one or more virtual world contacts from the social collaboration platform.

2. The information processing system of claim 1, wherein the processor is configured to determine the association by:
   identifying a first set of one or more social collaboration platform user identifiers each associated with a user in a plurality of users;
   identifying, in response to determining the first set of one or more social collaboration platform user identifiers, a second set of one or more social collaboration platform user identifiers from within the first set, wherein each user identifier in the second set of one or more social collaboration platform user identifiers is associated with a virtual world user identifier for the virtual world and is also associated with the virtual world user identifier associated with a user; and generating, in response to identifying the second set of one or more social collaboration platform user identifiers, the set of one or more social collaboration platform contacts for the respective user from the second set of one or more social collaboration platform user identifiers.

3. The information processing system of claim 1, wherein the processor is further configured to:

determine, in response to the updating and independent of the respective user's location within the virtual world, that an associated user associated with a contact within at least one of the respective user's social collaboration platform contacts and the virtual world contacts is online within at least one of the virtual world and the social collaboration platform, respectively; and notify, in response to determining that the associated user is online, the respective user that the associated user is online within at least one of the social collaboration platform and the virtual world, respectively.

4. The information processing system of claim 3, wherein the processor is further configured to:

determine, in response to determining that the associated user is online, a respective location of the associated user within the virtual world; and display, in response to determining the respective location, the location of the associated user to at least one of the respective user, the virtual world contacts of the respective contacts, other social network contacts of the respective user online in the virtual world.

5. The information processing system of claim 4, wherein the processor is further configured to:

accept, in response to the displaying, a selection from the respective user of an identifier representing the associated user within the virtual world; and relocate, in response to the accepting, an avatar associated with the respective user at the respective location within the virtual world of the associated user.

6. The information processing system of claim 3, wherein the processor is further configured to:

determine that a respective avatar of the associated user is located within the virtual world in proximity to an avatar associated with the respective user, and wherein the processor is configured to notify by notifying, in response to the determining that a respective avatar of the associated user is located within the virtual world in proximity to an avatar, the respective user that an identity of the avatar associated with the associated user has been verified.

7. The information processing system of claim 1, wherein the processor is further configured to:

receive a virtual world identifier verification request from the social collaboration platform in response to social collaboration platform detecting a social collaboration platform event associated with the user;

determine, in response to receiving the virtual world identifier verification request and based on the updating, that user is associated with the virtual world user identifier for virtual world; and notify, in response to determining that the user is associated with virtual world user identifier, the social collaboration platform that the user is associated with the virtual world user identifier for the virtual world.

8. The information processing system of claim 1, wherein the processor is further configured to:

receive a social collaboration platform identifier request from the at least one virtual world for the at least one user;

determine, in response to receiving the social collaboration platform identifier request, a set of one or more social collaboration platform user identifiers associated with the at least one user;

identify, for each social collaboration platform user identifier in the set of one or more social collaboration platform user identifiers, a social collaboration platform associated therewith; and notify the at least one virtual world of each social collaboration platform that has been identified.

9. A method for linking virtual world information with social collaboration platform information, the method comprising:

executing by a processor residing on an information processing system, the following:

storing, automatically and without user intervention, a virtual world user identifier that identifies a respective user of a plurality of users in at least one virtual world, the virtual world identifier being associated with a first contact list comprising a set of one or more virtual world contacts of the respective user, wherein each contact in the set of one or more virtual world contacts represents an avatar of other users of the at least one virtual world that is known by the respective user in the at least one virtual world, and wherein a unique virtual world identifier associated with each contact in the set of one or more virtual world contacts is stored within a set of user information of the respective user at the virtual world;

storing, automatically and without user intervention, a social collaboration platform user identifier that identifies the respective user in a social collaboration platform, the social collaboration platform user identifier being associated with a second contact list comprising a set of one or more social collaboration contacts for the respective user, wherein each contact in the set of one or more social collaboration contacts represents a participant in the a social collaboration platform that is known by the respective user in the a social collaboration platform, and wherein a unique social collaboration platform identifier associated with each contact in the set of one or more social collaboration contacts is stored within a set of user information of the respective user at the social collaboration platform;

obtaining, automatically and without user intervention, at least one of the set of one or more virtual contacts from the set of user information of the respective user at the virtual world and the set of one or more social collaboration contacts from the set of user information of the respective user at the social collaboration platform, for the respective user;

linking, automatically and without user intervention, in response to the virtual world and social collaboration platform identifiers being stored, the virtual world user identifier to the social collaboration platform user identifier, wherein the linking comprises associating the virtual world user identifier and the social collaboration platform user identifier to a unique identifier associated with the respective user in a data model, wherein the unique identifier is separate and distinct from the virtual world user identifier and the social collaboration platform user identifier;

determining, automatically and without user intervention, based on the linking, an association between at least one of each social collaboration contact of the set of one or more social collaboration contacts that has been obtained and the virtual world identifier of the respective user, and each virtual world contact of the set of one or more virtual world contacts that has been obtained and the social collaboration platform user identifier of the user;

identifying, automatically and without user intervention, an information set associated with at least one of the virtual world user identifier and the social collaboration identifier based on the unique identifier, the information set being at least one of the set of one or more social collaboration contacts and the set of one or more virtual world contacts; and updating, automatically and without user intervention based on in response the identifying, the information set to include the association that has been determined, wherein the information set enables the user to perform at least one of the following:

bi-directionally interact with the set of one or more social collaboration contacts from the at least one virtual world, or bi-directionally interact with the set of one or more virtual world contacts from the social collaboration platform.

10. The method of claim 9, wherein the determining the association further comprises:

identifying a first set of one or more social collaboration platform user identifiers each associated with a user in a plurality of users;

identifying, in response to determining the first set of one or more social collaboration platform user identifiers, a second set of one or more social collaboration platform user identifiers from within the first set, wherein each user identifier in the second set of one or more social collaboration platform user identifiers is associated with a virtual world user identifier for the virtual world and is also associated with the virtual world user identifier associated with a user; and generating, in response to identifying the second set of one or more social collaboration platform user identifiers, the set of one or more social collaboration platform contacts for the respective user from the second set of one or more social collaboration platform user identifiers.

11. The method of claim 9, further comprising:

determining, in response to the updating, that an associated user associated with a contact within at least one of the user's social collaboration platform contacts and the virtual world contacts is online within at least one of the virtual world and the social collaboration platform, respectively; and notifying, in response to determining that the associated user is online, the respective user that the associated user is online within at least one of the social collaboration platform and the virtual world, respectively.

12. The method of claim 11, further comprising:

determining, in response to determining that the associated user is online, a respective location of the associated user within the virtual world; and displaying, in response to determining the respective location, the location of the associated user to at least one of the respective user, the virtual world contacts of the respective contacts, other social network contacts of the respective user online in the virtual world.

13. The method of claim 12, further comprising:

accepting, in response to the displaying, a selection from the respective user of an identifier representing the associated user within the virtual world; and relocating, in response to the accepting, an avatar associated with the respective user at the respective location within the virtual world of the associated user.

14. The method of claim 11, further comprising:

determining that a respective avatar of the associated user is located within the virtual world in proximity to an avatar associated with the respective user, and wherein the notifying further comprises notifying, in response to the determining that a respective avatar of the associated user is located within the virtual world in proximity to an avatar, the respective user that an identity of the avatar associated with the associated user has been verified.

15. The method of claim 9, further comprising:

receiving a virtual world identifier verification request from the social collaboration platform in response to social collaboration platform detecting a social collaboration platform event associated with the user;

determining, in response to receiving the virtual world identifier verification request and based on the updating, that user is associated with the virtual world user identifier for virtual world; and notifying, in response to determining that the user is associated with virtual world user identifier, the social collaboration platform that the user is associated with the virtual world user identifier for the virtual world.

16. The method of claim 9, further comprising:

receiving a social collaboration platform identifier request from the virtual world for the user;

determining, in response to receiving the social collaboration platform identifier request and based on the updating, a set of one or more social collaboration platform user identifiers associated with the user;

identifying, for each social collaboration platform user identifier in the set of one or more social collaboration platform user identifiers, a social collaboration platform user identifiers associated therewith; and notifying the virtual world of each social collaboration platform that has been identified.

17. A non-transitory computer program product tangibly embodying computer readable instructions which, when implemented cause a computer to carry out the steps of a method for linking a virtual world information with a social collaboration platform information, the method comprising:

storing, automatically and without user intervention, a virtual world user identifier that identifies a respective user of a plurality of users in at least one virtual world, the virtual world identifier being associated with a contact list comprising a set of one or more virtual world contacts of the respective user, wherein each contact in the set of one or more virtual world contacts represents an avatar of other users of the at least one virtual world that is known by the respective user in the at least one virtual world, and wherein a unique virtual world identifier associated with each contact in the set of one or more virtual world contacts is stored within a set of user information of the respective user at the virtual world;

storing, automatically and without user intervention, a social collaboration platform user identifier that identifies the respective user in a social collaboration platform, the social collaboration platform user identifier being associated with a set of one or more social collaboration contacts for the respective user,
  wherein each contact in the set of one or more social collaboration contacts represents a participant in the a social collaboration platform that is known by the respective user in the a social collaboration platform, and
  wherein a unique social collaboration platform identifier associated with each contact in the set of one or more social collaboration contacts is stored within a set of user information of the respective user at the social collaboration platform;
obtaining, automatically and without user intervention, at least one of the set of one or more virtual contacts from the set of user information of the respective user at the virtual world and the set of one or more social collaboration contacts from the set of user information of the respective user at the social collaboration platform, for the respective user;
linking, automatically and without user intervention, in response to the virtual world and social collaboration platform identifiers being stored, the virtual world user identifier to the social collaboration platform user identifier,
  wherein the linking comprises associating the virtual world user identifier and the social collaboration platform user identifier to a unique identifier associated with the respective user in a data model,
  wherein the unique identifier is separate and distinct from the virtual world user identifier and the social collaboration platform user identifier;
determining, automatically and without user intervention, based on the linking, an association between at least one of
  each social collaboration contact of the set of one or more social collaboration contacts that has been obtained and the virtual world identifier of the respective user, and
  each virtual world contact of the set of one or more virtual world contacts that has been obtained and the social collaboration platform user identifier of the user;
identifying, automatically and without user intervention, an information set associated with at least one of the virtual world user identifier and the social collaboration identifier based on the unique identifier, the information set being at least one of the set of one or more social collaboration contacts and the set of one or more virtual world contacts; and
updating, automatically and without user intervention based on in response the identifying, the information set to include the association that has been determined, wherein the information set enables the user to perform at least one of the following:
  bi-directionally interact with the set of one or more social collaboration contacts from the at least one virtual world, or
  bi-directionally interact with the set of one or more virtual world contacts from the social collaboration platform.

18. The non-transitory computer program product of claim 17, wherein the method further comprises:
computer readable program code configured to identify a first set of one or more social collaboration platform user identifiers each associated with a user in a plurality of users;
identifying, in response to the first set of one or more social collaboration platform user identifiers being identified, a second set of one or more social collaboration platform user identifiers from within the first set, wherein each user identifier in the second set of one or more social collaboration platform user identifiers is associated with a virtual world user identifier for the one virtual world and is also associated with the virtual world user identifier associated with a user; and
generating, in response to the second set of one or more social collaboration platform user identifiers being identified, the set of one or more social collaboration platform contacts for the respective user from the second set of one or more social collaboration platform user identifiers.

19. The non-transitory computer program product of claim 17, wherein the method further comprises:
determining, in response to the information set being updated, that an associated user associated with a contact within at least one of the user's social collaboration platform contacts and the virtual world contacts is online within at least one of the social collaboration platform and the virtual world, respectively,
wherein the determining comprises performing, for at least one of the virtual world and the social collaboration platform, an online contact determination process every n time units, wherein the online contact determination process comprises at least:
  generating, for at least one of the virtual world and the social collaboration platform, at least one of a set of virtual world identifiers and a set of virtual world identifiers, respectively, wherein each identifier in the at least one of a set of virtual world identifiers and a set of virtual world identifiers is associated with a flag indicating that a user associated with the identifier is logged into the at least one of the virtual world and the social collaboration platform, respectively, and wherein each identifier in the at least one of a set of virtual world identifiers and a set of virtual world identifiers is also associated with a parameter indicating that the identifier is to be included in the online contact determination process; and
notifying, in response to the associated user being online, the respective user that the associated user is online within at least one of the virtual world and the social collaboration platform, respectively.

20. The non-transitory computer program product of claim 19, wherein the method further comprises:
determining, in response to that the associated user being online, a respective location of the associated user within the virtual world; and
displaying, in response to the respective location being determined, the location of the associated user to at least one of the respective user, the virtual world contacts of the respective contacts, other social network contacts of the respective user online in the virtual world.

21. The non-transitory computer program product of claim 20, wherein the method further comprises:
in response to the location being displayed, a selection from the respective user of an identifier representing the associated user within the virtual world; and relocating, in response to the selecting being accepted, an avatar associated with the respective user at the respective location within the virtual world of the associated user.

22. The non-transitory computer program product of claim 17, wherein the method further comprises:
receiving a virtual world identifier verification request from the social collaboration platform in response to social collaboration platform detecting a social collaboration platform event associated with the user;
determining, in response to the virtual world identifier verification request being received and based on the information set being updated, that user is associated with the virtual world user identifier for virtual world; and
notifying, in response to the user being associated with virtual world user identifier, the social collaboration platform that the user is associated with the virtual world user identifier for the virtual world.

23. The non-transitory computer program product 17, wherein the method further comprises:
receiving a social collaboration platform identifier request from the virtual world for the user;
determining, in response to the social collaboration platform identifier request being received and based on the information set being updated, a set of social collaboration platform user identifiers associated with the user;
identifying, for each social collaboration platform user identifier in the set of social collaboration platform user identifiers, a social collaboration platform associated therewith; and
notifying the virtual world of each social collaboration platform that has been identified.

24. The non-transitory computer program product of claim 19, wherein the method further comprises:
determining that a respective avatar of the associated user is located within the virtual world in proximity to an avatar associated with the respective user, and
wherein the notifying further comprises notifying, in response to the determining that a respective avatar of the associated user is located within the virtual world in proximity to an avatar, the respective user that an identity of the avatar associated with the associated user has been verified.

* * * * *